(12) United States Patent
Yoon et al.

(10) Patent No.: US 10,652,651 B2
(45) Date of Patent: May 12, 2020

(54) SPEAKER AND OPERATION METHOD THEREOF

(71) Applicant: SAMSUNG ELECTRONICS CO., LTD., Suwon-si, Gyeonggi-do (KR)

(72) Inventors: Eui-han Yoon, Suwon-si (KR); Seung-won Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/115,760

(22) Filed: Aug. 29, 2018

(65) Prior Publication Data

US 2019/0132671 A1 May 2, 2019

(30) Foreign Application Priority Data

Oct. 30, 2017 (KR) .................... 10-2017-0142174

(51) Int. Cl.

| | |
|---|---|
| *H04R 1/32* | (2006.01) |
| *H04R 1/28* | (2006.01) |
| *H04N 5/64* | (2006.01) |
| *H04R 1/34* | (2006.01) |
| *H04R 27/00* | (2006.01) |
| *H04R 1/40* | (2006.01) |

(52) U.S. Cl.
CPC ............. *H04R 1/323* (2013.01); *H04N 5/642* (2013.01); *H04R 1/2896* (2013.01); *H04R 1/345* (2013.01); *H04R 1/403* (2013.01); *H04R 27/00* (2013.01); *H04R 2201/021* (2013.01); *H04R 2201/025* (2013.01); *H04R 2227/003* (2013.01)

(58) Field of Classification Search
CPC ....... H04R 1/323; H04R 1/2896; H04N 5/642

USPC ......................................................... 381/387
See application file for complete search history.

(56) References Cited

U.S. PATENT DOCUMENTS

| | | | | |
|---|---|---|---|---|
| 6,257,365 | B1 * | 7/2001 | Hulsebus, II | G10K 11/28 181/155 |
| 6,314,191 | B1 * | 11/2001 | Smith | H04R 5/023 126/500 |

(Continued)

FOREIGN PATENT DOCUMENTS

| | | | | |
|---|---|---|---|---|
| JP | 2006025300 | * | 7/2004 | ............... H04R 1/00 |
| JP | 2006-025300 | | 1/2006 | |

(Continued)

OTHER PUBLICATIONS

Search Report mailed and Written Opinion dated Nov. 28, 2018 in counterpart International Patent Application No. PCT/KR2018/009438.

*Primary Examiner* — Oyesola C Ojo

(74) *Attorney, Agent, or Firm* — Nixon & Vanderhye P.C.

(57) ABSTRACT

A speaker is provided. The speaker includes a sound output unit comprising sound output circuitry having a sound emission hole disposed at one side, a sound reflector disposed at a lower side of the sound output unit and being spaced apart from the sound output unit, the sound reflector having a convex form upper side, and a support having one end fixed to the sound reflector and another end rotatably supporting the sound output unit, wherein the sound output unit is positioned in one of a first posture in which the sound emission hole faces the upper side of the sound reflector and a second posture in which the sound emission hole does not face the upper side of the sound reflector.

19 Claims, 15 Drawing Sheets

(56) References Cited

U.S. PATENT DOCUMENTS

| | | | |
|---|---|---|---|
| 9,667,906 B2 | 5/2017 | Yeo et al. | |
| 2003/0181127 A1* | 9/2003 | Chi | A63H 13/005 |
| | | | 446/300 |
| 2004/0020711 A1* | 2/2004 | China | H04R 1/2865 |
| | | | 181/176 |
| 2008/0226087 A1* | 9/2008 | Kinghorn | H04S 7/301 |
| | | | 381/59 |
| 2010/0215206 A1 | 8/2010 | Schneider | |
| 2011/0316768 A1* | 12/2011 | McRae | H04R 5/02 |
| | | | 345/156 |
| 2012/0027226 A1* | 2/2012 | Desenberg | H04N 7/15 |
| | | | 381/105 |
| 2012/0039476 A1 | 2/2012 | Cha | |
| 2013/0083537 A1* | 4/2013 | Harwood | F21V 33/0076 |
| | | | 362/253 |
| 2013/0170678 A1* | 7/2013 | Beddingfield, Sr. | H04M 3/56 |
| | | | 381/303 |
| 2014/0064549 A1* | 3/2014 | Liang | H04R 1/323 |
| | | | 381/387 |
| 2016/0117962 A1* | 4/2016 | Jung | G09G 3/20 |
| | | | 345/156 |
| 2016/0127831 A1 | 5/2016 | Merz | |
| 2016/0227315 A1 | 8/2016 | Kim et al. | |

FOREIGN PATENT DOCUMENTS

| | | | | |
|---|---|---|---|---|
| JP | 2006025300 | * | 1/2006 | H04R 1/00 |
| JP | 2009-213102 | | 9/2009 | |
| JP | 2013-077872 | | 4/2013 | |
| JP | 2013077872 | * | 4/2013 | H04R 1/34 |
| JP | 3203919 | | 4/2016 | |
| KR | 10-2012-0015667 | | 2/2012 | |
| KR | 10-2017-0028178 | | 3/2017 | |

\* cited by examiner

SPEAKER AND OPERATION METHOD THEREOF

CROSS-REFERENCE TO RELATED APPLICATION

This application is based on and claims priority under 35 U.S.C. § 119 to Korean Patent Application No. 10-2017-0142174, filed on Oct. 30, 2017 in the Korean Intellectual Property Office, the disclosure of which is incorporated by reference herein in its entirety.

BACKGROUND

Field

The disclosure relates generally to a speaker and an operating method thereof, and for example, to a speaker which may adjust an output direction of sound and an operating method thereof.

Description of Related Art

Supported by the development of electronic technology, various types of speakers have been developed and provided. Especially, a speaker in which a direction of progress of emitting sound is diversified has been developed.

FIG. 1A is a diagram illustrating a speaker which is in an emission structure in 360 degrees according to a prior art.

The speaker in the 360 degrees emission structure includes a 360 degrees sound reflector, and the emitted sound may be reflected by the 360 degrees sound reflector so that the direction of progress of the sound may direct all directions.

However, if the speaker in the 360 degrees emission structure is used, there may be an unnecessary power consumption because sound is emitted in all directions even if there is only one user.

FIG. 1B is a diagram illustrating a speaker in a front side emission structure according to a prior art.

The speaker which has the front side emission structure has a structure in which sound is emitted toward a front side of a user.

However, if the speaker having the front side emission structure is used, the user at a rear side of the speaker may have difficulty listening to sound as compared to the user at a front of the speaker.

Meanwhile, if a plurality of speakers having a front emission structure are equipped and the speakers are disposed in a circular form, the 360 degrees emission effect may be obtained. In this case, the front side emission or the 360 degrees emission could be selectively used, but there is a problem that a plurality of speakers are required. In addition, there is also a problem that a user's effort for changing the disposition is required for the front side emission or the 360 degrees emission.

Accordingly, it is needed to develop the speaker which supports the front side emission or the 360 degrees emission of sound with a more simple method.

SUMMARY

An aspect of the disclosure addresses the problems described above and provides a speaker which may adjust an output direction of sound so that the sound is emitted in one direction and also in all directions, and a controlling method thereof.

According to an example embodiment, a speaker is provided, the speaker including a sound output unit comprising sound output circuitry including a sound emission hole disposed at one side, a sound reflector disposed at a lower side of the sound output unit and being spaced apart from the sound output unit, the sound reflector having a convex form upper side, and a support having one end fixed to the sound reflector and another end rotatably supporting the sound output unit, wherein the sound output unit may be positioned in one of: a first posture (position) in which the sound emission hole faces the upper side of the sound reflector, and a second posture (position) in which the sound emission hole does not face the upper side of the sound reflector.

The second posture may be a posture in which the sound emission hole faces a direction vertical to a direction of the sound emission hole facing the upper side of the sound reflector.

The speaker may further include a controller configured to adjust at least one of a volume and an intensity of each frequency of output sound to be different in the first posture than in the second posture.

The speaker may further include a driver configured to drive the sound output unit to rotate, and a controller configured to control the driver to position the sound output unit in one of the first posture and the second posture.

The speaker may further include a sensor, and the controller may be configured to control the driver to position the sound output unit in one of the first posture and the second posture based on at least one of a number and a location of a user sensed by the sensor.

The controller may be configured to control the driver to position the sound output unit in the first posture if the number of the sensed user is equal to or greater than a predetermined number, and to control the driver to position the sound output unit in the second posture if the number of the sensed user is less than the predetermined number.

The driver may further include a first motor and a second motor that drive the sound output unit to rotate, and the controller may be configured to control the first motor to position the sound output unit in one of the first posture and the second posture by tilting the sound output unit, and to control the second motor to swivel the sound output unit in a horizontal direction in the second posture.

The speaker may further include a communicator comprising communication circuitry, and the controller, based on a signal that includes the sound being received via the communicator, may be configured to control the sound output unit to output the received signal, and to control the driver to position the sound output unit in the second posture based on a location of an electronic apparatus that provides the signal.

The speaker may further include a user interface, and the controller may be configured to control the driver to position the sound output unit in one of the first posture and the second posture based on a user command received via the user interface.

Sound output in the first posture may be reflected by the sound reflector to be emitted in all directions.

A method for operating a speaker that includes a sound output unit including a sound emission hole disposed at one side, a sound reflector disposed at a lower side of the sound output unit and being spaced apart from the sound output unit, and the sound reflector having a convex form upper side, and a support including one end fixed to the sound reflector and another end rotatably supporting the sound output unit, the method includes: emitting sound by the sound output unit which is positioned in any one of a first posture in which the sound emission hole faces an upper side of the sound reflector and a second posture in which the sound emission hole does not face the upper side of the sound reflector, and based on an occurrence of a predetermined event, positioning the sound output unit in another one of the first posture and the second posture and emitting the sound.

The second posture may be a posture in which the sound emission hole faces a direction vertical to a direction of the sound emission hole facing the upper side of the sound reflector.

The emitting the sound by being positioned in the other one may comprise changing a posture of the sound output unit and changing at least one of a volume and an intensity of each frequency of the sound.

The method may further include sensing a user, and positioning the sound output unit in one of the first posture and the second posture based on at least one of a number and a location of the sensed user.

The positioning may comprise positioning the sound output unit in the first posture based on the number of the sensed user being equal to or greater than a predetermined number, and positioning the sound output unit in the second posture based on the number of the sensed user being less than the predetermined number.

The emitting the sound may further include positioning the sound output unit in one of the first posture and the second posture by tilting the sound output unit, and swiveling the sound output unit in a horizontal direction based on the sound output unit being in the second posture.

The method may further include receiving a signal that includes the sound, outputting the received signal via the sound output unit, and positioning the sound output unit in the second posture based on a location of an electronic apparatus that provides the signal.

The method may further include receiving a user command, and positioning the sound output unit in one of the first posture and the second posture based on the received user command.

The sound output in the first posture may be reflected by the sound reflector to be emitted in all directions.

According to the above various example embodiments, the speaker may change the posture (position) of the sound output unit, and if the sound output unit is in a specific posture (position), the sound output from the sound output unit is emitted in all directions by the reflector and an effect that one of the emission in all directions and the emission in 360 degrees of the sound could be selected, may be provided.

BRIEF DESCRIPTION OF THE DRAWINGS

The above and other aspects, features and attendant advantages of various example embodiments of the present disclosure will be more apparent and readily appreciated from the following detailed description, taken in conjunction with the accompanying drawings, in which like reference numerals refer to like elements, and wherein.

DETAILED DESCRIPTION

Figure 1A:
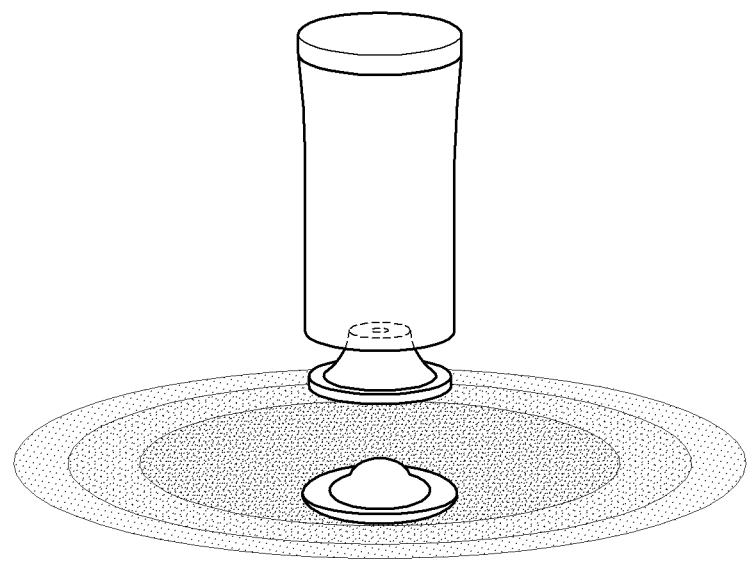
FIG. 1A is a diagram illustrating a speaker which has a 360 degrees emission structure according to a prior art.
Figure 1B:
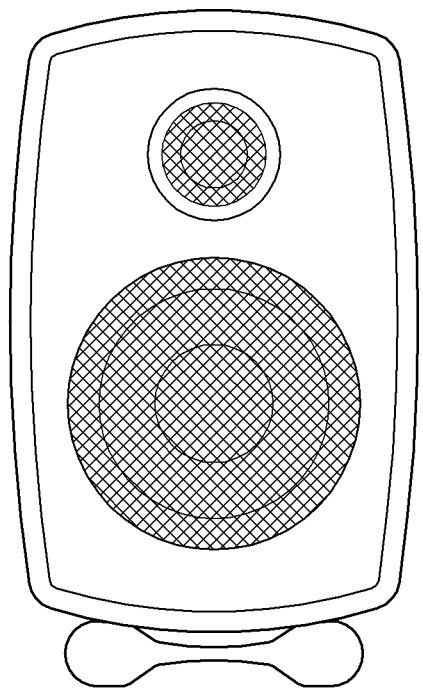
FIG. 1B is a diagram illustrating a speaker which has a front emission structure according to a prior art.

Various example embodiments of the present disclosure may be diversely modified. Accordingly, specific example embodiments are illustrated in the drawings and are described in greater detail in the present disclosure. However, it is to be understood that the present disclosure is not limited to a specific example embodiment, but includes all modifications, equivalents, and substitutions without departing from the scope and spirit of the present disclosure. Also, well-known functions or constructions may not described in detail where they may obscure the disclosure with unnecessary detail.

Hereinafter various example embodiments will be described in greater detail with reference to the accompanying drawings.

Figure 2:
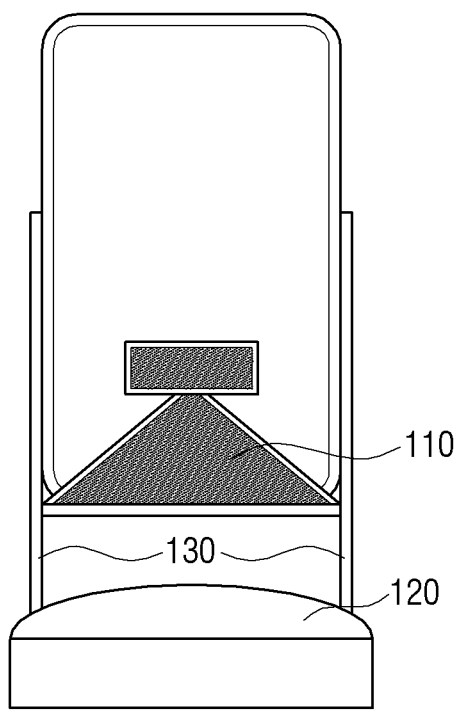
FIG. 2 is a diagram illustrating a speaker according to an example embodiment.

FIG. 2 is a diagram illustrating a speaker 100 according to an example embodiment. According to FIG. 2, the speaker 100 includes a sound output unit (e.g., including sound output circuitry) 110, a sound reflector 120, and a support 130.

The sound output unit 110 may include various sound output circuitry and receive an electric signal and emit sound by vibrating a diaphragm based on the received electric signal. For example, the sound output unit 110 includes a sound emission hole at one side and may emit sound through the sound emission hole. That is, the sound output unit 110 may emit sound only in one direction of progress. In addition, if the sound output unit 110 emits sound in one direction of progress, a form, a sort, etc. of the sound output unit 110 are not limited.

The sound emission hole may be in plane mesh form. Alternatively, the sound emission hole may be in a curved mesh form. However, it is not limited thereto, and the sound emission hole may not have a specific form. For example, one side of the sound output unit 110 is in a dented form and the sound output unit 110 may emit sound through a diaphragm disposed inside the dented area. In this case, the sound emission hole may refer to the dented area itself.

The sound reflector 120 may be disposed at a lower side of the sound output unit 110 and may be spaced apart from the sound output unit 110. However, it is not limited thereto, and the upper side of the sound reflector 120 may be disposed to be adjacent to one side of the sound output unit 110 based on a shape and a posture (position) of the sound output unit 110.

The upper side of the sound reflector 120 may be formed in (e.g., have) a dome shape and reflect the sound emitted from the sound output unit 110. For example, the upper side of the sound reflector 120 may be formed in a dome shape and reflect the sound emitted from the sound output unit 110 to a lower side. That is, in a state in which the sound emission hole of the sound output unit 110 faces the upper side of the sound reflector 120, the upper side of the sound reflector 120 may reflect the sound emitted from the sound output unit 110 to a lower side.

Alternatively, the upper side of the sound reflector 120 may be in a convex form or a pyramid form. However, it is not limited thereto, and the upper side of the sound reflector 120 may be in any form which could reflect the sound which is emitted by the sound output unit 110, to be emitted from the upper side of the sound reflector 120 to all directions.

The sound reflector 120 may be made of a material which may not absorb but reflect sound. For example, the sound reflector 120 may be made of a metal of which surface is smooth. However, it is not limited thereto, and the sound reflector 120 may be formed in a plastic with a smooth surface or any material which is appropriate for reflecting sound.

One end of the support 130 may be fixed to the sound reflector 120 and the other end of the support 130 may rotatably support the output unit 110. For example, as illustrated in FIG. 2, the support 130 may include two support columns and each support column may be fixed so that one end thereof is counter to the sound reflector 120. In addition, each support column may be connected so that the other end thereof is counter to the sound output unit 110.

However, it is not limited thereto, and the support 130 may be in any form which may connect the sound output unit 110 and the sound reflector 120, and rotate the sound output unit 110. For example, the support 130 may be formed to connect the sound output unit 110 and the sound reflector 120 and rotate the sound output unit 110 only with one support column.

Figure 3A:
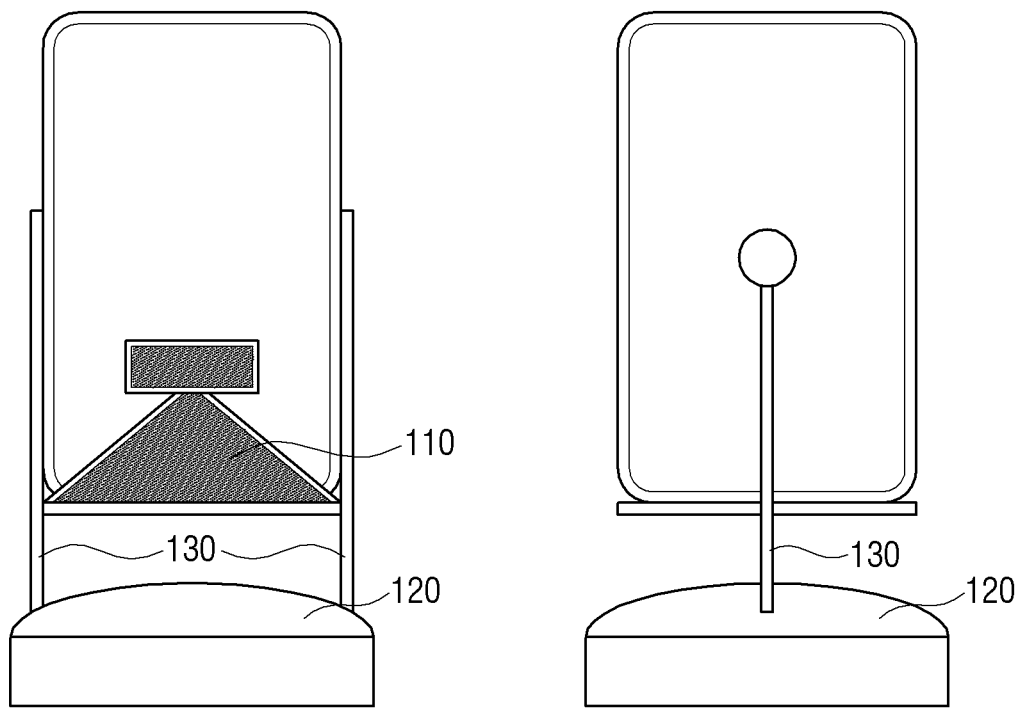
FIGS. 3A and 3B are diagrams illustrating a rotation of a sound output unit according to an example embodiment.
Figure 3B:
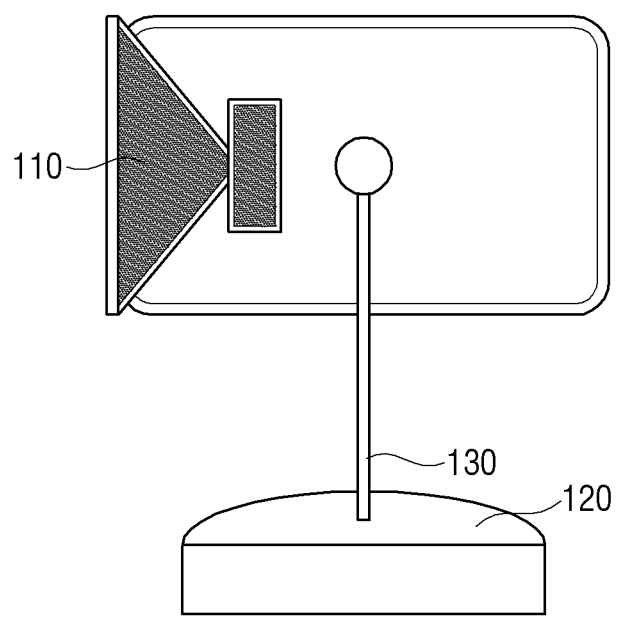

FIGS. 3A and 3B are diagrams illustrating an example of rotation of the sound output unit 110 according to an example embodiment.

The sound output unit 110 may be positioned in one of the first posture (position) in which the sound emission hole faces the upper side of the sound reflector 120 and a second posture (position) in which the sound emission hole does not face the upper side of the sound reflector 120. That is, a user may rotate and position the sound output unit 110 to be in the first posture or the second posture.

FIG. 3A illustrates a state in which the sound output unit 110 is in the first posture, and the left side of FIG. 3A is a view illustrating the speaker 100 at a front and the right side of FIG. 3A is a view illustrating the speaker 100 at a side.

In this case, the sound emitted from the sound output unit 110 may have a direction of progress at a lower side. The sound which has the direction of progress at a lower side may be emitted in all directions by being reflected by the sound reflector 120.

Meanwhile, as illustrated in FIG. 3B, the second posture may be the posture that faces a direction vertical to the direction of the sound emission hole facing the upper side of the sound reflector 120.

That is, the first posture and the second posture are within the range of a slope of the sound output unit 110. Especially, the first posture and the second posture may be expressed as a direction of progress of the sound emitted from the sound emitting unit 110.

For example, if it is assumed that the standard direction which is vertical to a surface and faces a lower side is in 0 degree, the first posture may, for example, be a case in which the direction of progress of sound is in 0-15 degrees based on the standard direction, and the second posture may be within another range of angle. Here, the range of angle may be changed based on the width of the sound reflector 120.

Meanwhile, the speaker 100 may further include a controller (not illustrated) which adjusts at least one of a volume and an intensity of each frequency of the output sound to be different in the first posture and the second posture. That is, the controller may control the sound output unit 110 to adjust at least one of a volume and an intensity of each frequency of the output sound to be different in the first posture and the second posture. For example, the controller may change the volume of sound in the first posture to be louder than in the second posture. Alternatively, the controller may set the intensity of a signal according to a frequency to be different in the first posture and in the second posture.

However, it is not limited thereto, and the controller may differently adjust at least one of a volume and an intensity of each frequency of output sound based on the slope of the sound output unit 110.

Alternatively, the sound output unit 110 may not change a volume and an intensity of each frequency of the output sound even if a posture is changed.

Meanwhile, it is described that a user rotates the sound output unit 110 manually in FIGS. 3A and 3B. Hereinafter an embodiment in which the speaker 100 further includes a driver which drives the sound output unit 110 to rotate will be described in greater detail below.

Figure 4:
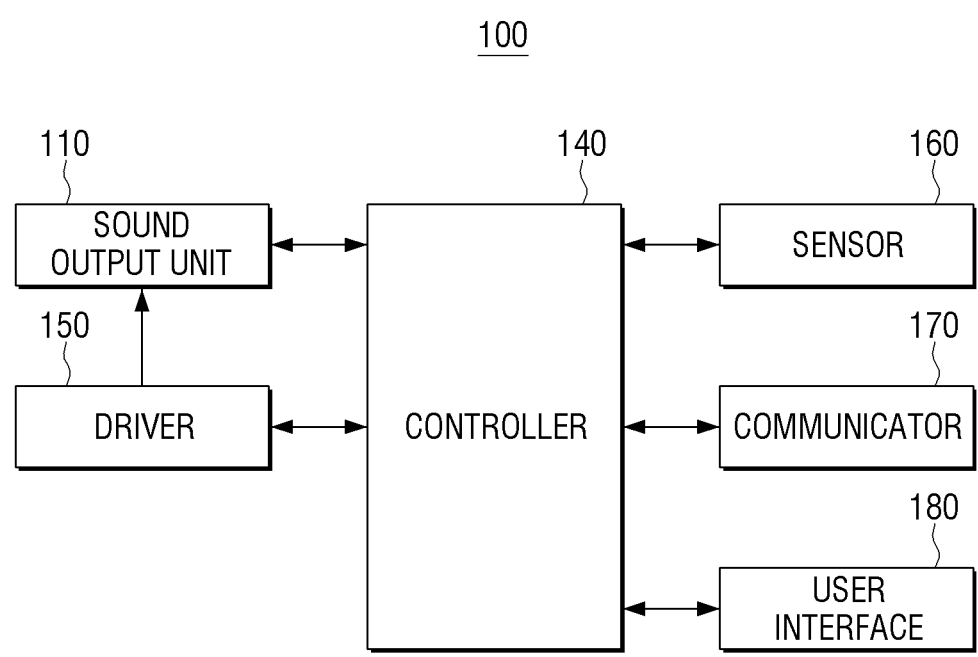
FIG. 4 is a block diagram illustrating an example configuration of a speaker according to an example embodiment.

FIG. 4 is a block diagram illustrating an example configuration of the speaker 100 according to an example embodiment.

As illustrated in FIG. 4, the speaker 100 may include the sound output unit (e.g., including sound output circuitry) 110, the controller (e.g., including processing circuitry) 140, the driver 150, a sensor 160, a communicator (e.g., including communication circuitry) 170, and a user interface 180. In addition, the speaker 100 may further include the sound reflector 120 and the support 130, but the sound reflector 120 and the support 130 are not illustrated in the drawing because the sound reflector 120 and the support 130 may not include a composition which may be controlled by the controller 140. Meanwhile, the description of the sound output unit 110 overlaps and thus will not be repeated here.

The controller 140 may include various processing circuitry and controls an overall operation of the speaker 100.

The controller 140 may control the sound output unit 110 to receive an electric signal and to emit sound by vibrating a diaphragm based on the received electric signal.

In addition, the controller 140 may control the driver 150 so that the sound output unit 110 is positioned in at least one of the first posture and the second posture.

Here, the driver 150 may drive the sound output unit 110 to rotate. For example, the driver 150 may include a motor to rotate the sound output unit 110.

Meanwhile, the controller 140 may control the driver 150 so that the sound output unit 110 is positioned in one of the first posture and the second posture based on at least one of the number and the location of the user sensed by the sensor 160.

Here, the sensor 160 may include various sensors, such as, for example, and without limitation, an infrared sensor, an image sensor, a temperature sensor, a Kinect, a depth camera, an ultrasonic wave sensor, or the like for sensing a user. For example, the sensor 160 may include a camera. The camera may be a component for photographing a still image or a video. The camera may be used for photographing a user at a front of the speaker 100. In this case, the sensor may include a plurality of cameras of which angle of view is wide, or include one camera and a motor for rotating the camera. The controller 140 may sense the number or location of the user from the image photographed by the camera.

Alternatively, the sensor 160 may sense at least one of the number and location of the user(s) based on the sound input through the microphone. For example, the controller 140 may divide a tone by analyzing the sound input through the microphone, and may sense the number of users based on the number of the divided tones. In addition, the sensor 160 may include a plurality of microphones, and the controller 140 may estimate the direction from which the sound is input based on the phase difference of the sound input through each microphone.

However, it is not limited thereto, and any method may be used which could sense the number or location of the users.

For example, and without limitation, the number of the sensed users is equal to or greater than a predetermined number, the controller 140 may control the driver 150 so that the sound output unit 110 is positioned in the first posture, and if the number of the sensed users is less than the predetermined number, the controller 140 may control the driver 150 so that the sound output unit 110 is positioned in the second posture.

For example, and without limitation, if the number of the sensed users is five or more than five, the controller 140 controls the driver 150 so that the sound output unit 110 is positioned in the first posture, and if the number of the sensed users is less than five, controls the driver 150 so that the sound output unit 110 is positioned in the second posture.

The controller 140 may further consider the location of the sensed user. For example, even if the number of the sensed users five or more than five, if the distance between the sensed users is within the predetermined distance, the controller 140 may control the driver 150 so that the sound output unit 110 is positioned in the second posture.

The controller 140 may divide all directions into a plurality of fan-shaped areas in a predetermined angle, and determine the posture of the sound output unit 110 based on whether a user is located in each fan-shaped area.

For example, the controller 140 may divide all directions into four fan-shaped areas in 90 degrees, and control the driver 150 so that only when users are located in three or more than three fan-shaped areas among the four fan-shaped areas, the sound output unit 110 is positioned in the first posture.

The controller 140 may determine the posture of the sound output unit 110 by considering only the location of the sensed user. For example, if two users are sensed in the counter locations, the controller 140 may control the driver 150 so that the sound output unit 110 is positioned in the first posture.

Meanwhile, the driver 150 may include various driving circuitry, such as, for example, and without limitation, the first motor and/or the second motor that drive the sound output unit 110 to rotate, the controller 140 may control the first motor to tilt the sound output unit 110 to be positioned in one of the first posture and the second posture, and control the second motor so that the sound output unit 110 is swiveled in a horizontal direction in the second posture.

For example, the controller 140 may be swiveled sequentially in a horizontal direction toward a sensed user when the sound output unit 110 is in the second posture.

However, for example, if the sound output unit 110 is in the first posture, the second motor may not be operated.

Meanwhile, if the sensor 160 is implemented in a camera or the like, the sensor 160 may further sense a gender, an age and the like of a user. In this case, the controller 140 may control the sound output unit 110 by considering at least one of gender and age of the user.

For example, in the case in which the sensed user is a child, the controller 140 may control the driver 150 so that the sound output unit 110 is in the first posture. That is, the speaker 100 may operate so that the emitted sound is emitted to all directions so as to protect the hearing of the child.

Meanwhile, the controller 140 may control the posture of the sound output unit 110 based on the sort of the output sound. For example, if the output sound is rock music, the controller 140 may control the driver 150 so that the sound output unit 110 is in the first posture, and if the output sound is classic music, the controller 140 may control the driver 150 so that the sound output unit 110 is in the second posture.

The controller 140 may determine the sort of the sound output from tag information of original data of the output sound. Alternatively, the controller 140 may determine the sort of the output sound from an average size of output sound.

Meanwhile, if the signal including sound is received through the communicator 170, the controller 140 may control the sound output unit 110 so that the received signal is output, and control the driver 150 so that the sound output unit 110 is positioned in the second posture based on the location of the electronic apparatus that provides a signal.

For example, if a user transmits music data with a smartphone to the speaker 100 which is connected to the smartphone through, for example, and without limitation, Bluetooth, the controller 140 may sense the location of the smartphone based on the music data signal and control the driver 150 so that the sound output unit 110 is in the second posture based on the sensed location.

In addition, if the driver 150 includes the second motor, the controller 140 may position the sound output unit 110 in the second posture and control the second motor so that the sound output unit 110 is swiveled in the direction facing the electronic apparatus that provides the signal.

The method for sensing the location of the electronic apparatus that provides a signal based on the signal including sound may be any method. For example, the speaker 100 may include two antennas, calculate an incident angle of a signal regarding the antennas based on the phase different, wavelength and the like, and sense the location of the electronic apparatus that provides the signal.

The communicator 170 may include various communication circuitry and communicates with various types of external electronic apparatuses according to various types of communication methods. The communicator 170 may include, for example, and without limitation, a WiFi chip, a Bluetooth chip, a wireless communication chip, and/or an NFC chip and the like. The controller 140 may perform communication with various types of external electronic apparatuses using the communicator 170.

The Wifi chip and the Bluetooth chip may perform communication in the Wifi method, and the Bluetooth method, respectively. When the WI-FI chip or the Bluetooth chip is used, various types of connection information such as SSID and session key may be first exchanged, and communication may be connected by using the connection information, and then various types of information may be exchanged. The wireless communication chip represents a chip which communicates according to various communication standards such as IEEE, Zigbee, 3rd Generation (3G), 3rd Generation Partnership Project (3GPP), Long Term Evolution (LTE) and so on. The NFC chip may mean a chip that operates by using a 13.56 MHz band from among various radio-frequency identification (RF-ID) frequency bands such as 135 kHz, 13.56 MHz, 433 MHz, 860-960 MHz, 2.45 GHz, or the like.

The communicator 170 may perform unilateral communication or bilateral communication with an external electronic apparatus. When unilateral communication is performed, the communicator 170 may receive a signal from an external electronic apparatus. When bilateral communication is performed, the communicator 170 may receive a signal from an external electronic apparatus or transmit a signal to an external electronic apparatus.

The controller 140 may control the driver 150 so that the sound output unit 110 is positioned in one of the first posture and the second posture according to a user command received through the user interface 180.

The user interface 180 may be configured to receive various user interactions. Herein, the user interface 180 may be implemented in various forms according to implementing example embodiments of the speaker 100. For example, and without limitation, the user interface 180 may include a button on the speaker 100, a microphone that receives a user voice, a camera that senses a user motion, or the like. Alternatively, if the speaker 100 is implemented to be an electronic apparatus based on touch, the user interface 180 may be implemented to be a touch screen that forms an interlayer structure with a touch pad.

For example, if the user interface 180 is implemented to be a button, a user may toggle the button, and the controller 140 may change the posture of the sound output unit 110 based on the toggle of the button.

The speaker 100 may further include a remote controller for controlling the speaker 100, and the user interface 180 may be included in the remote controller. In this case, if a user inputs a posture change command of the sound output unit 110 through the user interface 180 of the remote controller, the remote controller may transmit a control command to the speaker 100 and the controller 140 may change the posture of the sound output unit 110 based on the received control command.

The controller 140 may adjust at least one of a volume and an intensity of each frequency of output sound to be different in the first posture and the second posture.

For example, the controller 140 may change the posture of the sound output unit 110 based on the peripheral circumstance described above and adjust at least one of a volume and an intensity of each frequency of the output sound.

For example, when the sound output unit 110 is in the second posture, if the number of users is sensed equal to or more than a predetermined number, the controller 140 may control the driver 150 so that the sound output unit 110 is in the first posture, and control the sound output unit 110 to increase a volume of the sound.

Meanwhile, the controller 140 may transmit the usage pattern of a user and sensed information to an external server. The external server may analyze the usage pattern of a user and sensed information, and transmit the control command based on the analyzed information to the speaker 100.

For example, if a user is alone, the user may use the speaker 100 to be in the second posture, and if there are more people, the user may use the speaker 100 to be in the first posture. Here, the posture of the speaker 100 may be controlled by the user. The controller 140 may sense the number of the user through the sensor 160 and transmit the posture of the speaker 100 according to the number of the users to an external server.

Thereafter, when the speaker 100 is not operated, if a plurality of users are sensed, the controller 140 may transmit the sensed information to an external server, and the external server may transmit the control command for controlling the posture of the speaker 100 to be in the first posture to the speaker 100 based on the sensed information. That is, the controller 140 may control the posture of the speaker 100 based on the usage pattern of the user.

However, it is not limited thereto, and the controller 140 may store the usage pattern of a user in a storage without an external server and control the posture of the speaker 100 based on the stored usage pattern. For example, the controller 140 may generate the usage pattern by itself.

In addition, the speaker 100 may be an artificial intelligence speaker. In this case, the controller 140 may receive a user command from a user and transmit the user command to an artificial intelligence server. The artificial intelligence server may generate a control command corresponding to a user command, and transmit the generated control command to the artificial intelligence speaker.

The artificial intelligence server may store the user command and the corresponding control command, and generate database. For example, the artificial intelligence server may store an input time, space, input method and the like of the user command and generate the database, and learn the generated database to generate a usage pattern of a user.

If the sensed information or a user command is received from the artificial intelligence speaker, the artificial intelligence server may generate the control command corresponding to the received information based on the learned usage pattern, and provide the control command to the artificial intelligence speaker. The controller 140 may perform a corresponding function according to the received control command or perform an interaction with a user such as giving an inquiry to the user. For example, the controller 140 may control the driver 150 so that the sound output unit 110 is in the first posture based on the received control command, but may provide with an inquiry message to a user such as "Change the posture to the first posture?" Here, the controller 140 may display the inquiry message through the display included in the artificial intellectual speaker, or emit the inquiry message as sound through the sound output unit 110.

The artificial intellectual server may be implemented to be one device with the artificial intellectual speaker. The artificial intellectual speaker may, for example, perform learning in real time based on a usage pattern of a user or detection information, and interact with a user based on the learned data.

As described above, the speaker 100 may include the controller 140 and change the posture of the sound output unit 110 automatically by the controller 140.

Figure 5A:
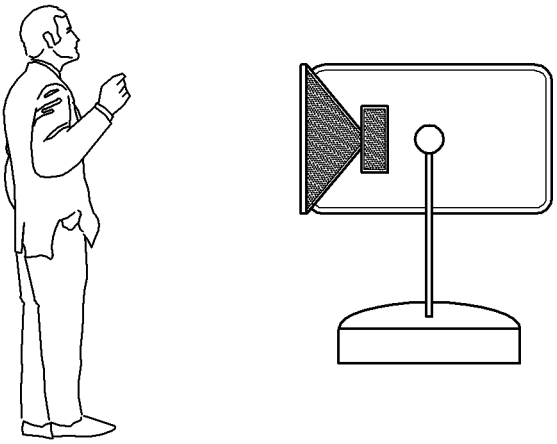
FIGS. 5A and 5B are diagrams illustrating a positioning operation based on a sensed user according to an embodiment.
Figure 5B:
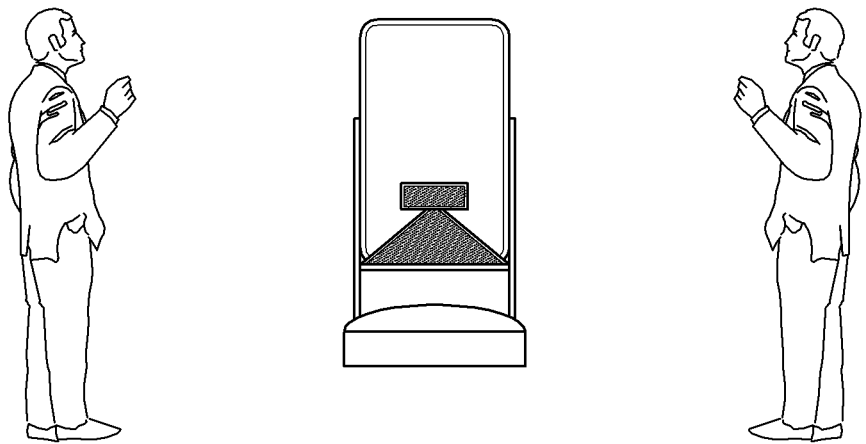

FIGS. 5A and 5B are diagrams illustrating an example positioning operation based on a sensed user according to an example embodiment.

First, as illustrated in FIG. 5A, the controller 140 may sense one of the user at the left through the sensor 160 and control the driver 150 so that the sound output unit 110 is in the second posture. However, also in this case, if there is an additional control of a user, the controller 140 may control the driver 150 so that the sound output unit 110 is in the first posture.

In addition, as illustrated in FIG. 5B, if one more user is sensed at the right side through the sensor 160, the controller 140 may control the driver 150 so that the sound output unit 110 is in the first posture.

If one more user is sensed at the left side in the state such as FIG. 5A, the controller 140 may not change the posture of the sound output unit 110.

In addition, the controller 140 may recognize a face of a user and sense only the user of which face is recognized as a valid user. For example, if a user watches the right direction, not the speaker 100 direction in FIG. 5B, the controller 140 may determine only the user at the left as a valid user and not change the posture of the sound output unit 110.

That is, if it is determined that a user listens the sound emitted from the sound output unit 100, the controller 140 may sense the corresponding user as a valid user.

The controller 140 may determine the valid user based on the movement of a user. For example, if a movement is not sensed for more than a predetermined time such as the case in which a left user fell asleep in the state such as FIG. 5B, the controller 140 may exclude the user at the left from the valid user. Accordingly, the controller 140 may control the driver 150 so that the sound output unit 110 is in the second posture. Here, the controller 140 may control the driver 150 so that the sound emission hole of the sound output unit 110 faces the user at the right.

The speaker 100 may further include the storage in which registered user information is stored. The controller 140 may determine whether the sensed user is a valid user based on whether there is user information corresponding to the sensed user among the registered user information stored in the storage. The storage may be implemented, for example, and without limitation, to be a storing medium such as a memory, and any apparatus which may store data.

The storage may further store a priority order information of registered users. The storage 140 may determine the posture of the sound output unit 110 based on the priority order information stored in the storage.

For example, the user of which priority order is high is assigned high weight, and the user of which priority order is low may be assigned low weight. In addition, if the sum of weights of the sensed users exceeds a predetermined value, the controller 140 may control the driver 150 so that the sound output unit 110 is in the first posture.

While it is described in FIGS. 5A and 5B that a user is sensed, the sensor 160 may sense a thing. For example, the controller 140 may sense a thing such as a wall through the sensor 160 and in this case, the controller 140 may control the driver 150 so that the sound output unit 110 is in the second position because one side of the speaker 100 is a wall. Here, the controller 140 may control the driver 150 so that the sound emission hole of the sound output unit 110 faces an opposite direction of the wall.

Figure 6:
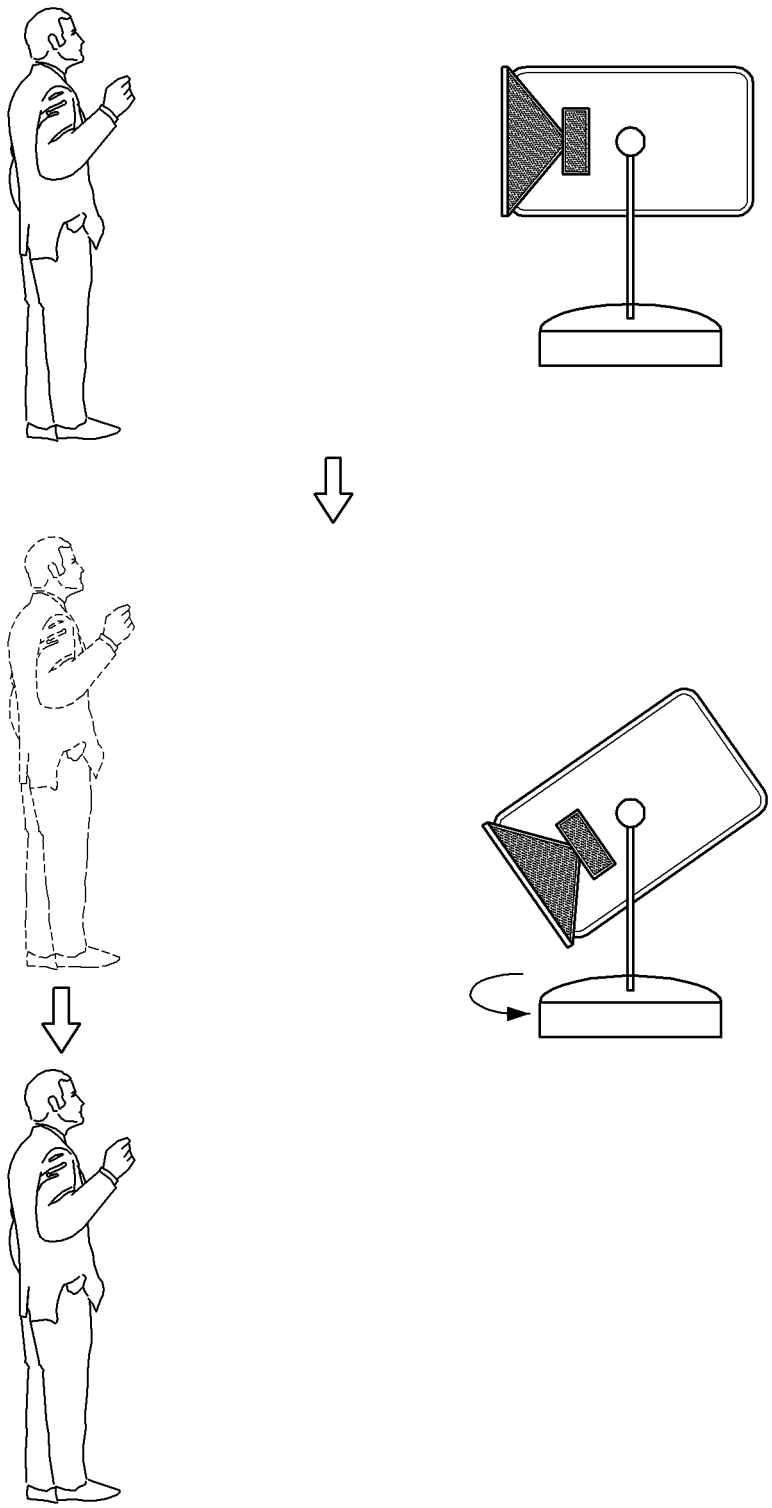
FIG. 6 is a diagram illustrating an example operation of a speaker based on a movement of a location of a user according to an example embodiment.

FIG. 6 is a diagram illustrating an operation of the speaker 100 based on the movement of a location of a user according to an example embodiment. Here, the driver 150 of the speaker 100 includes the second motor which swivels the sound output unit 110 in a horizontal direction.

As illustrated at an upper side of FIG. 6, the controller 140 may sense one user at the left side and control the driver 150 so that the sound output unit 110 is in the second posture.

Thereafter, as illustrated at the lower side of FIG. 6, if the location of the user is changed, the controller 140 may swivel the sound output unit 110 to correspond to the location of the changed user's location.

The controller 140 may determine the posture of the sound output unit 110 based on the distance from a user. For example, if a user moves far away from the speaker 100 more than a predetermined distance when the sound output unit 110 is in the first posture, the controller 140 may control the driver 150 so that the sound output unit 110 is in the second posture. That is, as a user moves far, a user may listen sound easily through a front emission.

Figure 7:
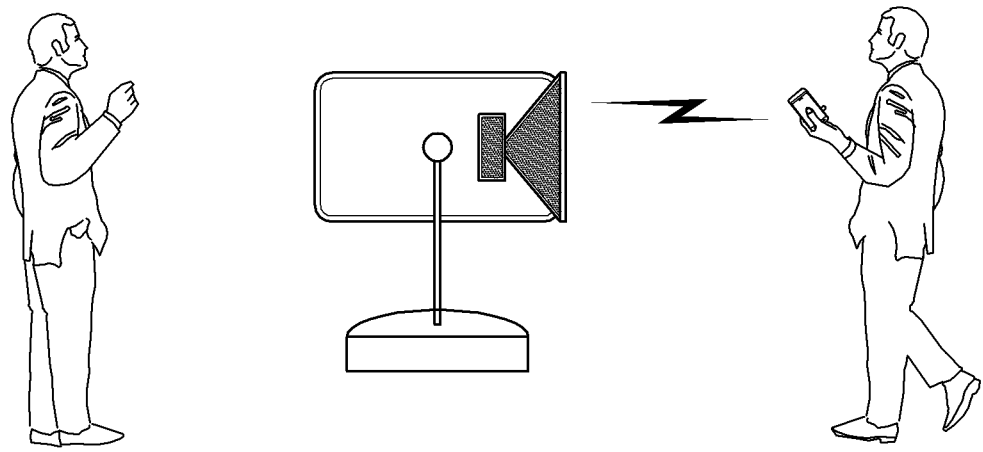
FIG. 7 is a diagram illustrating an example operation of a speaker with regard to an electronic apparatus that provides a signal according to an example embodiment.

FIG. 7 is a diagram illustrating an example operation of the speaker 100 regarding the electronic apparatus that provides a signal according to an example embodiment.

The controller 140 may determine the posture of the sound output unit 110 based on the location of the electronic apparatus that provides a signal including sound. For example, as illustrated in FIG. 7, the controller 140 may control the driver 150 based on the location of the electronic apparatus at the right that provides a signal including sound, so that the sound output unit 110 is in the second posture. Here, the controller 140 may control the driver 150 so that the sound emission hole of the sound output unit 110 faces the right side.

Figure 8A:
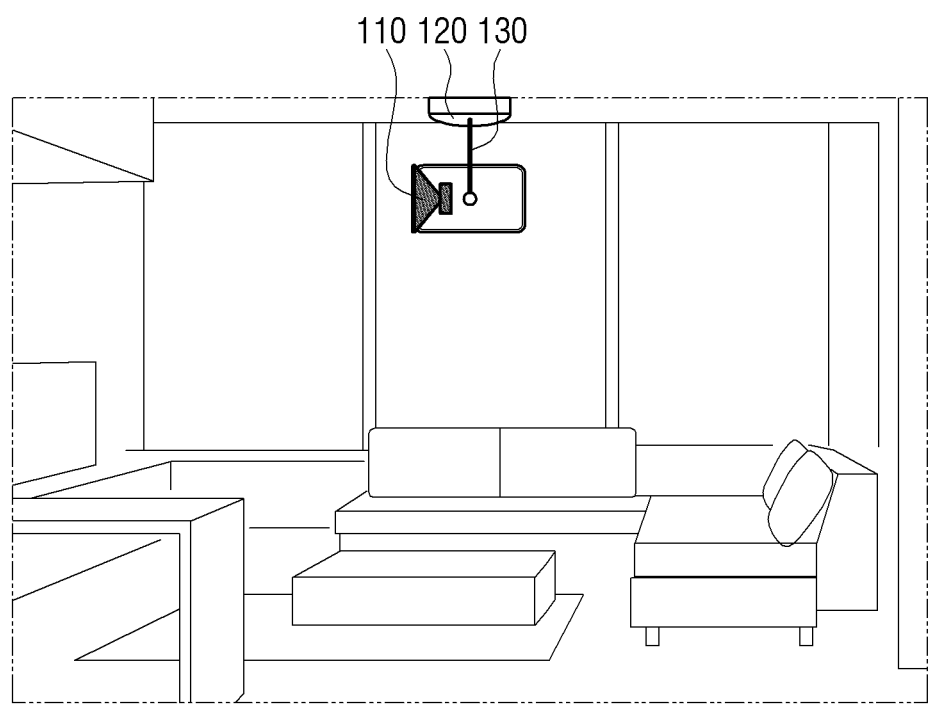
FIGS. 8A and 8B are diagrams illustrating an example structure of a speaker according to another example embodiment.
Figure 8B:
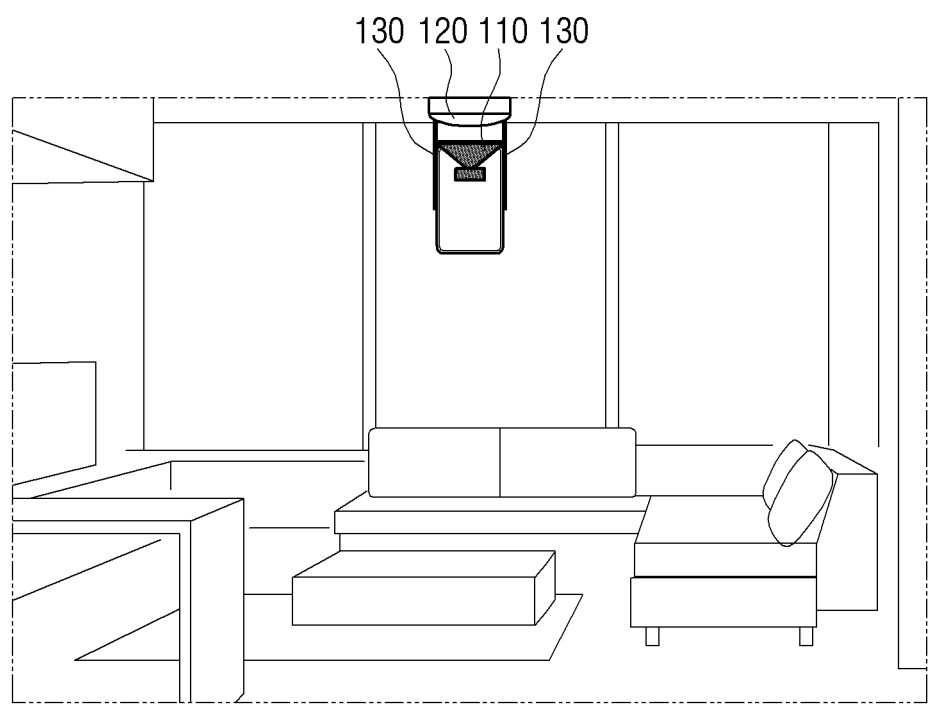

FIGS. 8A and 8B are diagrams illustrating an example structure of the speaker 100 according to another example embodiment.

As illustrated in FIGS. 8A and 8B, the sound emission unit 120 of the speaker 100 may be attached to a ceiling. Accordingly, the first side of the sound reflector 120 having, for example, a dome shape may face a lower side, and reflect the sound emitted from the sound output unit 110 to an upper side to all directions.

The second side which is opposite to the first side of the sound reflector 120 is formed flat to touch the ceiling. Alternatively, the second side may touch a floor. That is, a user may dispose the speaker 100 so that the second side of the sound reflector 120 touches one of the ceiling and the floor.

Figure 9A:
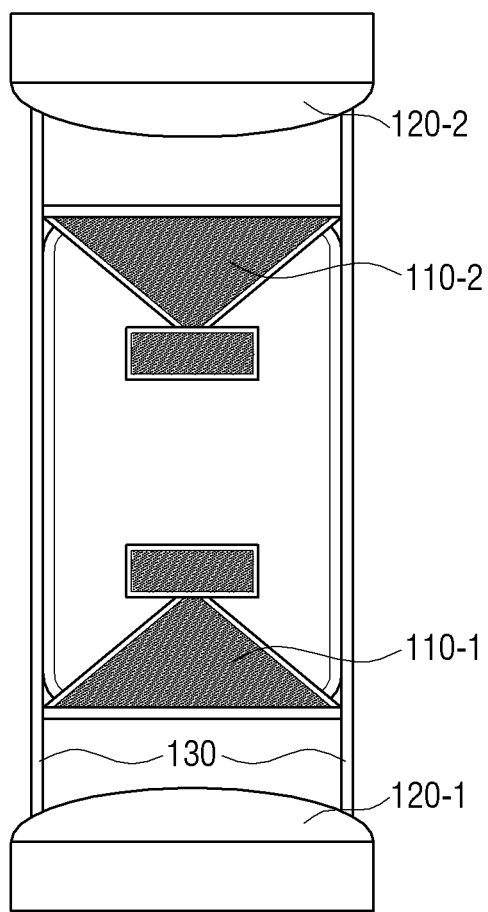
FIGS. 9A and 9B are diagrams illustrating an example structure of a speaker according to another example embodiment.
Figure 9B:
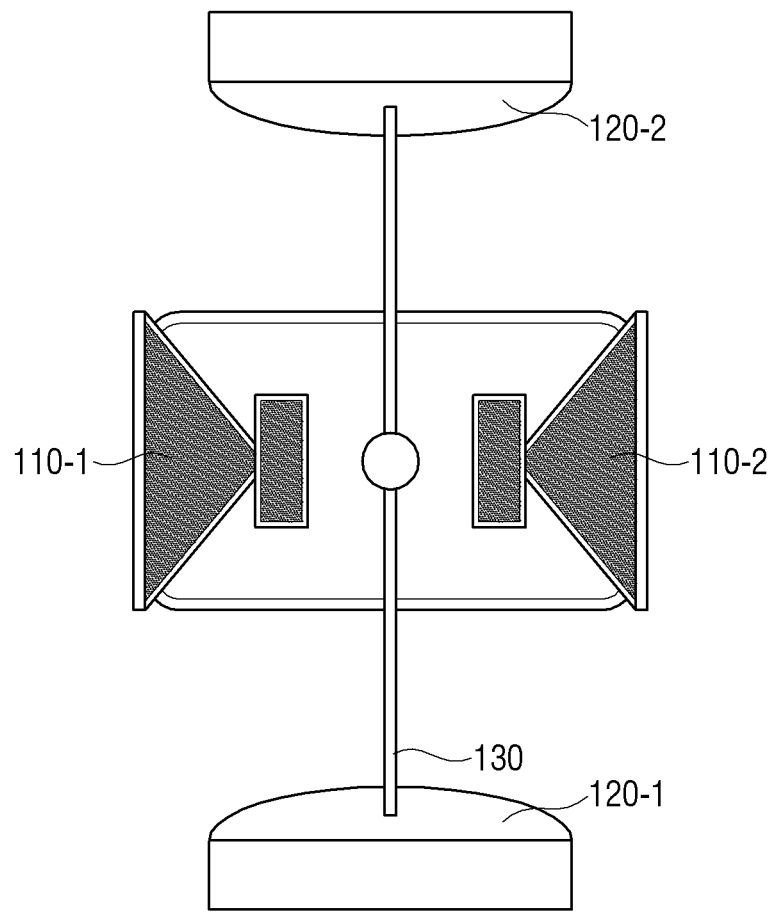

FIGS. 9A and 9B are diagrams illustrating an example structure of the speaker 100 according to another example embodiment.

According to FIGS. 9A and 9B, the speaker 100 may include the first sound output unit 110-1, the second sound output unit 110-2, the first sound reflector 120-1, the second sound reflector 120-2, and the support 130.

According to FIG. 9A, the first sound output unit 110-1 and the first sound reflector 120-1 may be disposed opposite to the second sound output unit 110-2 and the second sound reflector 120-2, respectively. In addition, the sound emitted from the second sound output unit 110-2 may be reflected in all directions by the second sound reflector 120-2.

As illustrated in FIG. 9B, the controller 140 may control the driver 150 so that the first sound output unit 110-1 and the second sound output unit 110-2 are in the second posture. In this case, the direction of the sound emitted from the first sound output unit 110-1 and the second sound output unit 110-2 may be opposite to each other.

The controller 140 may stop one operation of the first sound output unit 110-1 and the second sound output unit 110-2 if the first sound output unit 110-1 and the second sound output unit 110-2 are in the second posture. For example, if the first sound output unit 110-1 and the second sound output unit 110-2 are in the second posture, the controller 140 may stop one operation of the first sound output unit 110-1 and the second sound output unit 110-2 based on the location of the sensed user.

Figure 10:
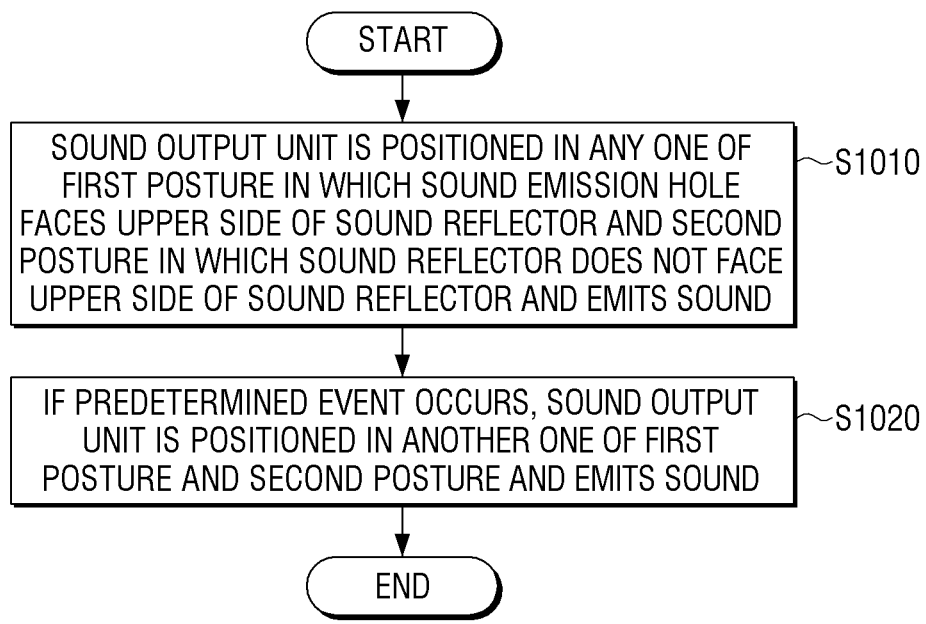
FIG. 10 is a flowchart illustrating an example method of operation of a speaker according to an example embodiment.

FIG. 10 is a flowchart illustrating an example method of operating the speaker according to an example embodiment.

A method for operating a speaker that includes a sound output unit comprising sound output circuitry and including a sound emission hole at one side, a sound reflector disposed at a lower side of the sound output unit and being spaced apart from the sound output unit, the sound reflector having a dome shaped upper side, and a support including one end fixed to the sound reflector and another end rotatably supporting the sound output unit, the method including: emitting sound by the sound output unit positioned in any one of a first posture in which the sound emission hole faces the upper side of the sound reflector and a second posture in which the sound emission hole does not face the upper side of the sound reflector in S1010.

In addition, if a predetermined event occurs, the sound output unit is positioned in another one of the first posture and the second posture and emits sound in S1020.

The second posture may be a posture in which the sound emission hole faces a direction vertical to a direction of the sound emission hole facing the upper side of the sound reflector.

The emitting the sound by being positioned in another one of the first posture and the second posture, S1020, comprises changing a posture of the sound output unit and changing at least one of a volume and an intensity of each frequency of the sound.

In addition, the method may further include sensing a user and positioning the sound output unit in one of the first posture and the second posture based on at least one of a number and a location of the sensed user.

The positioning may comprise positioning the sound output unit in the first posture if the number of the sensed user is equal to or greater than a predetermined number, and positioning the sound output unit in the second posture if the number of the sensed user is less than the predetermined number.

Meanwhile, the emitting the sound, may further comprise positioning the sound output unit in one of the first posture and the second posture by tilting the sound output unit, and swiveling the sound output unit in a horizontal direction if the sound output unit is in the second posture.

The method may further include receiving a signal that includes the sound, outputting the received signal via the sound output unit, and positioning the sound output unit in the second posture based on a location of an electronic apparatus that provides the signal.

The method may further include receiving a user command, and positioning the sound output unit in one of the first posture and the second posture according to the received user command.

The sound output in the first posture may be reflected by the sound reflector to be emitted in all directions.

According to various embodiments, the speaker may change the posture of the sound output unit and if the sound output unit is in a specific posture, the sound output from the sound output unit is reflected in all directions by the sound reflector and thus there may be an effect that a front emission or 360 degrees emission could be selected.

In the above, it has been described that the sound output unit rotates, but it is not limited thereto. For example, the sound output unit may be fixed so that the direction of progress of the sound emitted through the sound emission hole is parallel to a surface, and may further include a reflector that may move a circular arc which is based on the sound output unit as a center. If the all directions emission mode is used, the reflector may be located at a front side of the sound emission hole so that sound is reflected to face an upper side of the sound reflector. If the front emission mode is used, the reflector may be removed from the front of the sound emission hole so that sound is not reflected.

Although various example embodiments of the present disclosure have been illustrated and described hereinabove, the present disclosure is not limited to the above-mentioned example embodiments, but may be variously modified by those skilled in the art to which the present disclosure pertains without departing from the scope and spirit of the disclosure as set forth, for example, in the accompanying claims. These modifications should also be understood to fall within the scope of the present disclosure.

What is claimed is:

1. A speaker comprising:
   a sound output unit comprising sound output circuitry and including a sound emission hole disposed at one side;
   a sound reflector disposed at a lower side of the sound output unit and being spaced apart from the sound output unit, the sound reflector having a convex dome-shaped upper side; and
   a support having one end fixed to the sound reflector and another end rotatably supporting the sound output unit;
   wherein the sound output unit is configured to be selectively moveable by being swiveled about a vertical axis and rotated about a horizontal axis, and to be selectively moveable from a first posture in which the sound emission hole faces the upper side of the sound reflector and a second posture in which the sound emission hole does not face the upper side of the sound reflector, and vice versa.

2. The speaker as claimed in claim 1, wherein the second posture includes a posture in which the sound emission hole faces a direction vertical to a direction of the sound emission hole facing the upper side of the sound reflector.

3. The speaker as claimed in claim 1, further comprising:
   a controller configured to adjust at least one of a volume and an intensity of each frequency of output sound to be different in each of the first posture and the second posture.

4. The speaker as claimed in claim 1, further comprising:
   a driver configured to drive the sound output unit to rotate; and
   a controller configured to control the driver to position the sound output unit in one of the first posture and the second posture.

5. The speaker as claimed in claim 4, further comprising:
   a sensor,
   wherein the controller is configured to control the driver to position the sound output unit in one of the first posture and the second posture based on at least one of a number and a location of a user sensed by the sensor.

6. The speaker as claimed in claim 5, wherein the controller is configured to control the driver to position the sound output unit in the first posture based on the number of the sensed user being equal to or greater than a predetermined number, and to control the driver to position the sound output unit in the second posture based on the number of the sensed user being less than the predetermined number.

7. A speaker comprising:
   a sound output unit comprising sound output circuitry and including a sound emission hole disposed at one side;
   a sound reflector disposed at a lower side of the sound output unit and being spaced apart from the sound output unit, the sound reflector having a convex form upper side; and a support having one end fixed to the sound reflector and another end rotatably supporting the sound output unit;
wherein the sound output unit is configured to be selectively moveable from a first posture in which the sound emission hole faces the upper side of the sound reflector and a second posture in which the sound emission hole does not face the upper side of the sound reflector, and vice versa;
a driver configured to drive the sound output unit to rotate;
a controller configured to control the driver to position the sound output unit in at least one of the first posture and the second posture;
wherein the driver includes a first motor and a second motor configured to drive the sound output unit to rotate, and
wherein the controller is configured to control the first motor to position the sound output unit in one of the first posture and the second posture by tilting the sound output unit, and to control the second motor to swivel the sound output unit in a horizontal direction in the second posture.

8. A speaker comprising:
a sound output unit comprising sound output circuitry and including a sound emission hole disposed at one side;
a sound reflector disposed at a lower side of the sound output unit and being spaced apart from the sound output unit, the sound reflector having a convex form upper side; and
a support having one end fixed to the sound reflector and another end rotatably supporting the sound output unit;
wherein the sound output unit is configured to be selectively moveable from a first posture in which the sound emission hole faces the upper side of the sound reflector and a second posture in which the sound emission hole does not face the upper side of the sound reflector, and vice versa;
a driver configured to drive the sound output unit to rotate;
a controller configured to control the driver to position the sound output unit in at least one of the first posture and the second posture;
a communicator comprising communication circuitry,
wherein the controller is configured to control the sound output unit to output a received signal based on a signal that includes the sound being received via the communicator, and to control the driver to position the sound output unit in the second posture based on a location of an electronic apparatus that provides the signal.

9. The speaker as claimed in claim 4, further comprising:
a user interface,
wherein the controller is configured to control the driver to position the sound output unit in one of the first posture and the second posture based on a command received via the user interface.

10. The speaker as claimed in claim 1, wherein sound output in the first posture is reflected by the sound reflector to be emitted in all directions.

11. A method for operating a speaker that includes a sound output unit comprising sound output circuitry having a sound emission hole disposed at one side, a sound reflector disposed at a lower side of the sound output unit and being spaced apart from the sound output unit, the sound reflector having a convex dome-shaped upper side, and a support having one end fixed to the sound reflector and another end rotatably supporting the sound output unit, the method comprising:
emitting sound by the sound output unit which is positioned in any one of a first posture in which the sound emission hole faces the upper side of the sound reflector and a second posture in which the sound emission hole does not face the upper side of the sound reflector;
positioning the sound output unit in another one of the first posture and the second posture and emitting the sound based on an occurrence of a predetermined event; and
swiveling the sound out unit about a vertical axis, and rotating the sound output unit about a horizontal axis.

12. The method as claimed in claim 11, wherein the second posture includes a posture in which the sound emission hole faces a direction vertical to a direction of the sound emission hole facing the upper side of the sound reflector.

13. The method as claimed in claim 11, wherein the emitting the sound by being positioned in another one of a first posture and a second posture comprises changing a posture of the sound output unit and changing at least one of a volume and an intensity of each frequency of the sound.

14. The method as claimed in claim 11, further comprising:
sensing a user; and
positioning the sound output unit in one of the first posture and the second posture based on at least one of a number and a location of the sensed user.

15. The method as claimed in claim 14, wherein the positioning comprises positioning the sound output unit in the first posture based on the number of the sensed user being equal to or greater than a predetermined number, and positioning the sound output unit in the second posture based on the number of the sensed user being less than the predetermined number.

16. The method as claimed in claim 11, wherein the emitting the sound further comprises:
positioning the sound output unit in one of the first posture and the second posture by tilting the sound output unit, and
swiveling the sound output unit in a horizontal direction based on the sound output unit being in the second posture.

17. The method as claimed in claim 11, further comprising:
receiving a signal that includes the sound;
outputting the received signal via the sound output unit; and
positioning the sound output unit in the second posture based on a location of an electronic apparatus that provides the signal.

18. The method as claimed in claim 11, further comprising:
receiving a command; and
positioning the sound output unit in one of the first posture and the second posture based the received command.

19. The method as claimed in claim 11, wherein the sound output in the first posture is reflected by the sound reflector to be emitted in all directions.

* * * * *